United States Patent [19]
Saiga

[11] Patent Number: 5,111,617
[45] Date of Patent: May 12, 1992

[54] END STRUCTURE OF WEATHER-STRIP

[75] Inventor: Shinji Saiga, Chiba, Japan

[73] Assignee: Kinugawa Rubber Industrial Co., Ltd., Japan

[21] Appl. No.: 646,393

[22] Filed: Jan. 28, 1991

[30] Foreign Application Priority Data

Jan. 30, 1990 [JP] Japan .................................. 2-20044

[51] Int. Cl.5 .............................................. E06B 7/16
[52] U.S. Cl. ........................................ 49/494; 49/475
[58] Field of Search ......................... 49/494, 493, 475

[56] References Cited
U.S. PATENT DOCUMENTS 3,404,675 10/1968 Payne ................. 49/493 X
3,952,454 4/1976 Sudo ................... 49/494 X Primary Examiner—Philip C. Kannan
Attorney, Agent, or Firm—Ronald P. Kananen

[57] ABSTRACT

An end structure to provide protection from ambient enviroment concurrently with reinforcing end portion rigidity for a weather-strip having a hollow end portion to be installed on a vehicle body, includes stay means, with an attachment portion for being secured to the vehicle body through the weather-strip, to fix the position of the stay means and weather-strip. Also included is sealing means such as an end cap with a base member for assembly with the stay means, and a covering member to cover the open end of the weather-strip.

7 Claims, 3 Drawing Sheets

END STRUCTURE OF WEATHER-STRIP

BACKGROUND OF THE INVENTION

1. Field of The Invention

The present invention relates generally to an end structure for weather-stripping. Specifically, this invention relates to an end structure for weather-strip mounted on body panels of automotive vehicles.

2. Description of The Background Art

Weather-strips, formed of rubber and mounted between two members, such as a vehicle body and a window, for sealing therebetween as a form of weather protection, are well known to those skilled in the art.

Conventionally, the end or ends of such weather-stripping have been covered by vulcanized rubber members to protect the strip from deterioration and to enhance the appearance thereof when mounted on the vehicle. Alternatively, clip members have been employed at end portions, for enhanced appearance as well as to raise the rigidity of the end portion, strength, and ease of installation. A typical clip portion is composed of a stay having a plate configuration formed of resin or such, an attachment member projecting from an appropriate position on a surface of the stay, and a securing member extended from an edge of another surface of the stay. The stay is placed on the weather-strip, then the attachment member pierces the wall of the weather-strip to position and mount the stay on the vehicle body. Lastly, the securing member is secured so as to cover the edge portion of the end of the weather-strip. Thus, an end treatment of the weather-strip is accomplished concurrently with fixing the weather-strip to the body panel.

However, such end structures have certain drawbacks. That is, when the aforementioned clip is adapted to a weather-strip having a hollow portion therewithin, the surface of the hollow is exposed to the ambient environment because the stay is inserted into the hollow and the securing member covers only a portion of the whole circumference of the edge of the weather-strip. Therefore, the rubber surfaces at the edge of the weather-strip are prone to damage.

In addition, the appearance of such an end structure is easily degraded in a relatively short time.

SUMMARY OF THE INVENTION

It is therefore a principal object of the present invention to provide an end structure for a weather-strip to protect a hollow formed within the weather-strip against deterioration or damage, concurrently with reinforcing an open end of the weather-strip to increase rigidity.

It is another object of the present invention to provide an end structure for a weather-strip which can enhance the appearance thereof with high durability.

In order to accomplish the aforementioned and other objects, an end structure for a weather-strip including a hollow end portion to be attached to a vehicle body comprises: stay means for providing additional rigidity to the weather-strip end portion, the stay means including an attachment member at a desired position of a first surface of the stay means for determining a position of the end structure against the vehicle via the weather-strip; and sealing means including a base member attached to the stay means and a covering member fixed to the base member to cover the hollow end of the weather-strip for establishing sealing of the hollow end of the weather-strip from an ambient environment.

In addition, the covering member may be formed integrally with the base means.

Further to say, the covering member can be formed so as to mate with an open end of the weather-strip and having a diameter the same as the outer diameter of the weather-strip. The sealing means may include an extended member which extends parallel to the base member to hold an inner circumference of the hollow end of the weather-strip.

The stay means may also include a first engagement member on a second surface, adjacent an edge corresponding to the hollow end of the weather-strip; and the sealing means may further include a second engagement member adjacent a center portion thereof, the first and second engagement members being cooperatively engageable.

It is preferable that the first engagement member is formed as a rib which projects in a direction opposite the extending direction of the attachment member and the second engagement member has a hole having a diameter allowing engagement with the rib. However, alternatively, the first engagement member may be formed with a hole and the second engagement member is a rib having a diameter so as to allow insertion into the hole.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
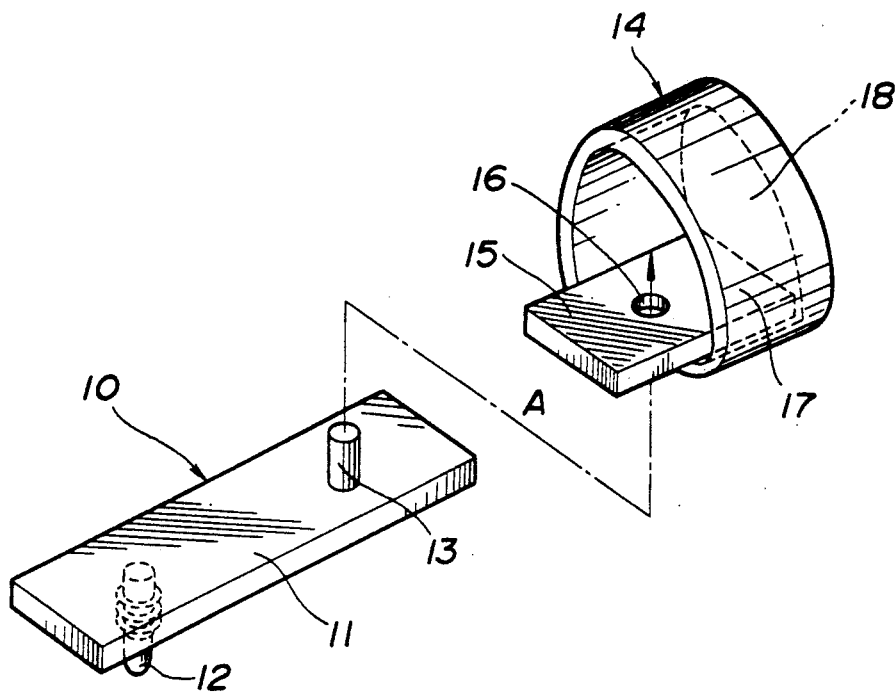
FIG. 1 is a perspective exploded view of an end structure of a weather-strip according to the present invention.
Figure 2:
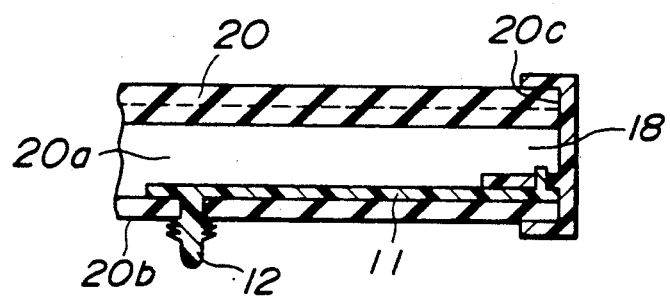
FIG. 2 is a sectional view of the assembled end structure of FIG. 1.

Referring now to the drawings, particularly to FIGS. 1 and 2, a clip member 10 is composed of a stay 11 having a plate configuration which is formed of synthetic resin or similar material, an attachment member 12 projected from a surface of the stay 11 which is installed at an appropriate position, and a rib 13 on an edge of the stay 11, projecting from the surface of the stay 11 opposite the attachment member 12, and extending oppositely thereto.

Separate from the stay portion 11, an end cap member 14 also forms part of the end structure of the invention. The end cap 14 is composed of a base member 15 having a plate configuration, and formed of synthetic resin or so forth, and a hole 16 opened adjacent the center portion of the base member 15. The diameter of the hole 16 is such as to engage the rib 13 of the stay 11. A covering member 17 is attached to the edge portion of the base member 15. The covering member 17 has a substantially semicircular configuration having a hollow 18 at a desired position therein so as to cover the outer circumference of a weather-strip.

Alternatively, the stay portion 11 may be formed with a hole rather than a rib. In that case, a rib portion is included on the base member 15 and is engaged by the hole of the stay portion 11.

The assembly of the aforementioned clip member 10 and end structure for a weather-strip is described hereinbelow.

The rib 13 projecting from the stay 11 is engaged with the hole 16 formed in the base member 15 of the end cap 14, as shown by the broken line A in FIG. 1. Then the stay 11 is inserted into the hollow 20a of a weather-strip 20 as shown in FIG. 2. The attachment member 12 pierces the wall 20b of the weather-strip 20 through to a body panel of an automotive vehicle (not shown). Thus the positions of the stay 11 and the weather-strip 20 are determined against the body panel. An end 20c of the weather-strip 20 is engaged by the hollow 18 of the end cap 14 to establish sealing of the end 20c.

In this manner, when the weather-strip 20 is secured to a body panel of an automotive vehicle by the attachment member 12, concurrently, treatment of the end 20c of the weather strip 20 is accomplished.

Figure 3:
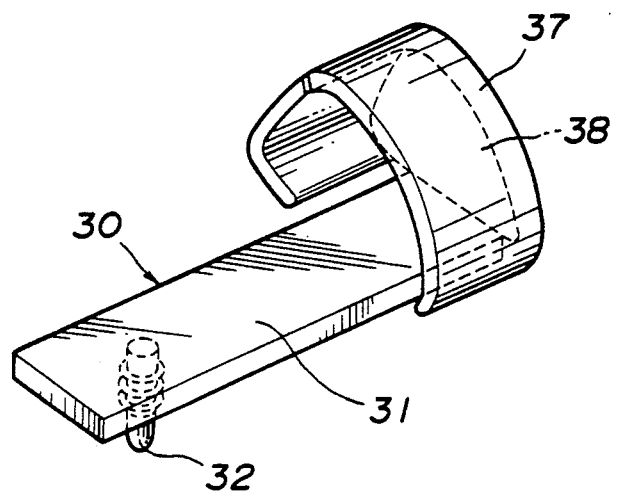
FIG. 3 is a perspective view of an end structure of a weather-strip according to a second embodiment of the present invention.

Referring now to FIG. 3 indicating a second embodiment of the present invention, a clip member 30 is composed of a stay 31 having an attachment member 32 with a covering member 37. The covering member 37 is fixed to the stay 31 by molding. In this arrangement, the covering member 37 acts as the end cap 14 of the first embodiment. The covering member 37 has a hollow 38 at a desired position therein and formed in a substantially semicircular configuration.

By this arrangement, since the covering member, which acts as an end cap for the weather-strip, is formed integrally with the clip member, additional manufacturing steps for forming an end cap such as shown in FIG. 1 can be omitted.

Figure 4:
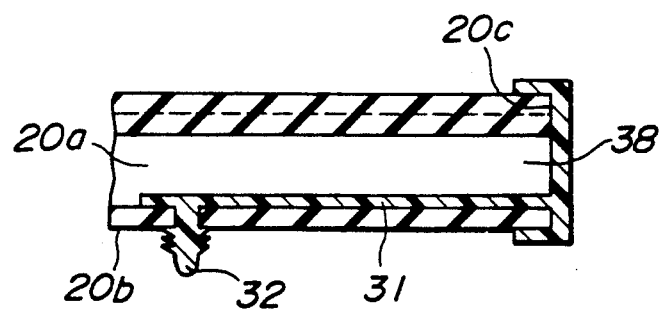
FIG. 4 is a sectional view of the assembled end structure of FIG. 3.

FIG. 4 shows an assembled sectional view of such a clip assembled with a weather-strip.

Figure 5:
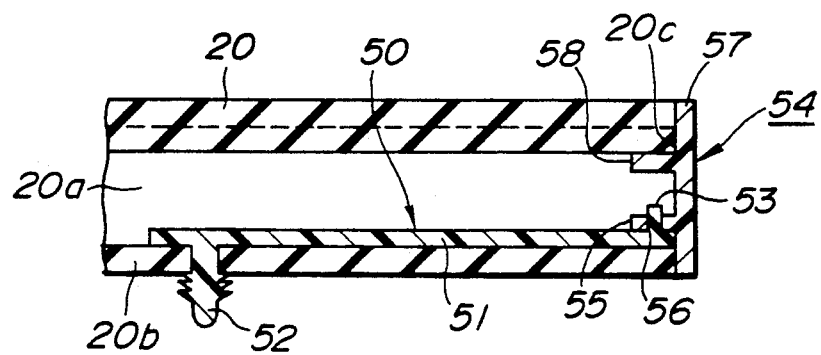
FIG. 5 is an assembled sectional view of a third embodiment according to the present invention.

Referring now to FIG. 5, which shows a third embodiment of the present invention, a clip 50 is composed of a stay 51, an attachment member 52 projecting from the stay 51, and a rib 53, extending from the stay 51 in a direction opposite the attachment member 52, similarly to the structure shown in FIGS. 1 and 2 of the first embodiment. An end cap 54 is separately formed of synthetic resin or other suitable material. The end cap 54 is composed of a first base member 55 having a hole 56 adjacent the center portion of the member 55 to engage the rib 53 projected from the stay 51. A covering member 57 extends from the first base member 55 so as to cover the corresponding end 20c of the weather-strip 20. A second base member 58 extends from the covering member 57 in a direction parallel to the first base member 55.

During assembly, the first and second base members 55 and 58 are inserted into the hollow 20a of the weather-strip 20. Sealing is established by engagement of the rib 53 of the clip member 50 with the hole 56 of the end cap 54.

By this arrangement, the hollow 18 of the end cap, as included in the first embodiment (FIGS. 1 and 2), may be omitted and the end cap 54 may have the same diameter as the outer diameter of the weather-strip 20.

Figure 6:
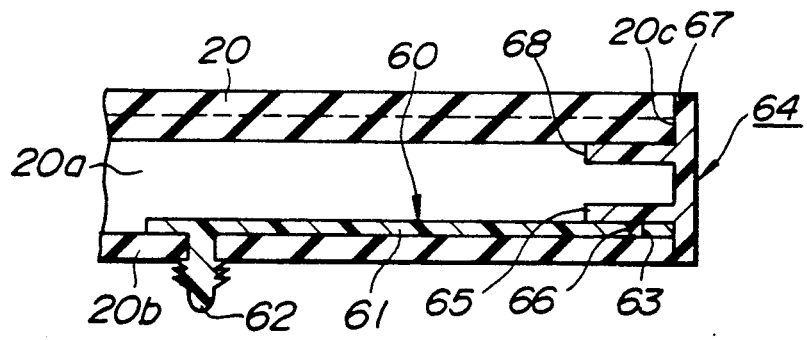
FIG. 6 is an assembled section view of a fourth embodiment according to the present invention.

Referring now to FIG. 6, showing a fourth embodiment of the present invention, a base structure is formed similar to the aforementioned embodiments, i.e., a clip 60 is composed of a stay 61 and an attachment member 62, which is projected from the stay. However, in this embodiment, a hole 63 is formed in the end of the stay 61 instead of a rib. An end cap 64 is separately formed of synthetic resin or other suitable material, and is composed of a first base member 65 having a projection 66 adjacent its center portion, which engages the hole 63 formed in the stay 61. A covering member 67 extends from the first base member 65 so as to cover the corresponding end 20c of the weather-strip 20. A second base member 68 extends from the covering member 67 in a direction parallel to the first base member 65. When assembling the present embodiment, like the third embodiment, the first and second base members 65 and 68 are inserted into the hollow 20a of the weather-strip 20 and sealing to the end 20c of the weather-strip 20 is accomplished by engagement of the hole 63 of the clip 60 with the rib 66 of the end cap 64. The hollow 18 of the end cap may be omitted.

As previously mentioned, the clip having the end cap at the end thereof may be simply inserted into the hollow of a weather-strip in the longitudinal direction of the stay. The attachment member projected from the stay pierces the weather-strip to the body panel of the automotive vehicle, and position determination of the clip and weather-strip is accomplished. Furthermore, because the end cap is formed so as to engage the outer or inner circumference of the weather-strip, the rubber surface of the end and the hollow of the weather-strip are never exposed to ambient environment. Therefore, deterioration of the rubber end portion or hollow portion of the end of the weather-strip can be simply and effectively avoided.

Additionally, the above described structure considerably enhances the appearance of the end portions of a vehicle mounted weather-strip.

More to say, assembly of the clip is simplified by the integral structure of the stay and end cap, therefore, manufacturing costs, and time required for installation can be considerably reduced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An end structure for attachment of a weather-strip having a hollow end portion to a vehicle body comprising:

stay means for providing additional rigidity to said weather-strip end portion, said stay means including an attachment member at a desired position of a first surface of said stay means for determining a position of said end structure against said vehicle via said weather-strip; and sealing means including a base member attached to said stay means and a covering member fixed to said base member to cover said hollow end of said weather-strip for establishing sealing of said hollow end of said weather-strip from an ambient environment.

2. An end structure for a weather-strip as set forth in claim 1, wherein said covering member is formed integrally with said base member.

3. An end structure for a weather-strip as set forth in claim 2, wherein said covering member is formed so as to mate with said hollow end of said weather-strip and having the same diameter as the outer diameter of said hollow end.

4. An end structure for a weather-strip as set forth in claim 1, wherein said sealing means has an extending member which extends parallel to said base member to hold an inner circumference of said hollow end of said weather-strip.

5. An end structure for a weather-strip as set forth in claim 1, wherein said stay means further includes a first engagement member on a second surface, adjacent an edge corresponding to said hollow end of said weather-strip; and said sealing means further includes a second engagement member adjacent a center portion thereof, said first and second engagement members being cooperatively engageable.

6. An end structure for a weather-strip as set forth in claim 5, wherein said first engagement member is a rib projected in a direction opposite the extending direction of said attachment member and said second engagement member includes a portion defining a hole having a diameter allowing engagement with said rib.

7. An end structure for a weather-strip as set forth in claim 5, wherein said first engagement member includes a portion defining a hole and said second engagement member is a rib having a diameter so as to allow insertion of said rib into said hole.

* * * * *